MAX HAEBERLEIN
*INVENTOR.*

March 10, 1953

M. HAEBERLEIN 2,631,050

AUTOMATIC SHUTDOWN SEAL SYSTEM
FOR CENTRIFUGAL COMPRESSORS

Filed March 31, 1949

MAX HAEBERLEIN
*INVENTOR.*

BY

March 10, 1953 — M. HAEBERLEIN — 2,631,050
AUTOMATIC SHUTDOWN SEAL SYSTEM FOR CENTRIFUGAL COMPRESSORS
Filed March 31, 1949 — 3 Sheets-Sheet 3
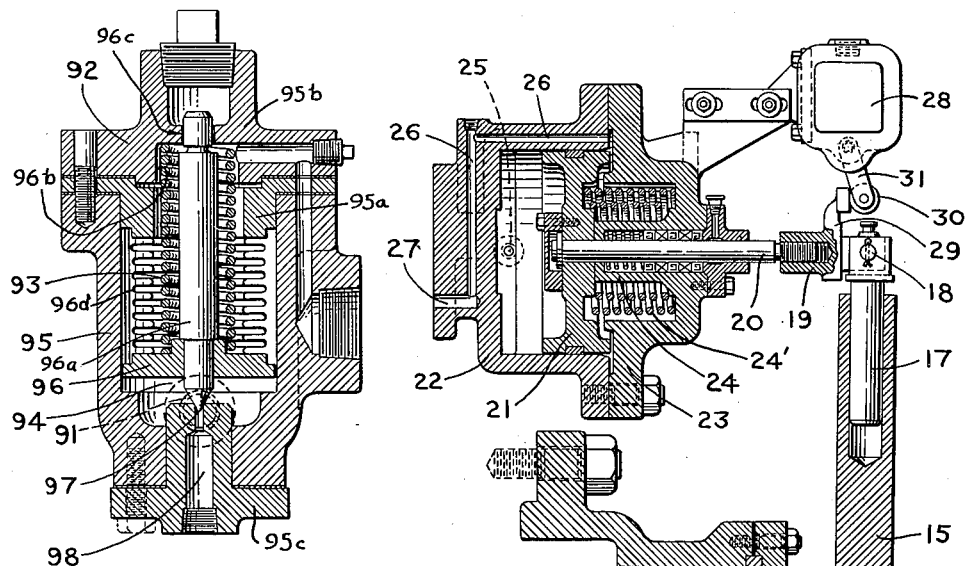
FIG. 5
FIG. 3
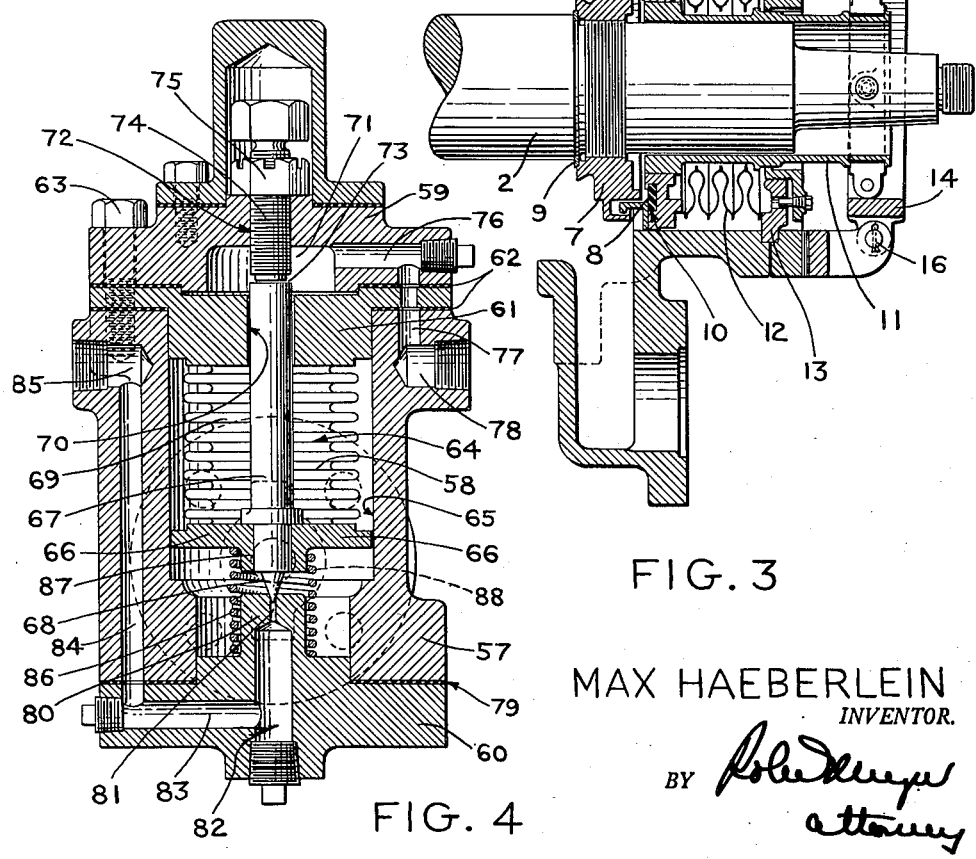
FIG. 4
MAX HAEBERLEIN
INVENTOR.

Patented Mar. 10, 1953

2,631,050

UNITED STATES PATENT OFFICE 2,631,050

AUTOMATIC SHUTDOWN SEAL SYSTEM FOR CENTRIFUGAL COMPRESSORS

Max Haeberlein, Maplewood, N. J., assignor to Worthington Corporation, Harrison, N. J., a corporation of Delaware Application March 31, 1949, Serial No. 84,578

6 Claims. (Cl. 286—9)

This invention relates generally to centrifugal compressors and more particularly to a shut down seal system for centrifugal compressors having a timing valve therein responsive to differential pressure.

In centrifugal compressors to prevent gas loss usually the compressors are designed whereby gas leakage occurs only along the shaft. Accordingly, means are further provided to prevent gas leakage along the shaft by providing an inner seal when the compressor is operating and an outer seal for the shutdown periods or emergency shut downs which occur. The inner seal and outer seal generally are operated in conjunction with the lubrication system.

The outer seal mechanism or shut down seal system makes a positive seal during such shut down periods by means of a resilient ring structure which is compressed into fluid tight contact with a seal collar, by a lever and spring arrangement responsive to a piston enclosed in a cylinder. The lubricant has an inlet and exit passage in the cylinder which is constructed and arranged in relation to the piston so that it will move the piston which in turn moves the lever and spring which controls the movement of the shut down seal to effect the desired result.

For automatic operation of the shut down seal system the present compressors on the market employ in the lubrication system a solenoid valve wherein an orifice is utilized to allow the lubricant pressure operating the piston to reduce gradually in accordance with the slow down speed of the rotor of the compressor, the orifice being sized in accordance with the time period desired. This slow down time period, however, varies considerably between compressors and accordingly it is very difficult to secure exact automatic operation by the sizing of the orifice. The solenoid control, furthermore, operates in a negative manner in that it merely prevents the high pressure already present in the system and the cylinder from reducing too rapidly.

It has been found that difficulties have resulted from this means of automatic control especially where power failure or auxiliary pump mishaps have occurred due to the fact that the orifice is not a satisfactory means of controlling the lubricant flow and pressure and as a result thereof causes the seal faces to either make early contact resulting in the seal faces being burned and necessitating their replacement or delayed contact resulting in a large loss of gas.

In addition to this is the hazard engendered on those compressors which are used in refineries or chemical plants where volatile and highly flammable materials are being compressed, due to the close relationship and position of the electrical circuit which controls the operation of the solenoid switch.

The present invention contemplates replacing the solenoid type of control by a timing system and apparatus which will be positively responsive to the oil pressure in the system at all times and which can be easily adjusted in accordance with the stopping times of the respective compressors upon which it is to be used, and is designed to prevent the abovementioned difficulties and also to eliminate the electrical hazard by the type of operation of the mechanism.

Accordingly, it is an object of the present invention to provide means for controlling the shut down seal automatically responsive to the oil pressure in the compressor system.

It is another object of the present invention to provide a timing system responsive to an oil pressure differential which will control the opening and closing of the shut down seal and which may be regulated according to the desired time requirements of operation on each particular compressor.

It is another object of the present invention to provide an automatic shut down seal which will operate satisfactorily when power failure or other mishaps requiring emergency shut downs of the compressors occur.

It is a further object of the present invention to provide a system to control the oil flow and pressure controlling the shut down seal in accordance with the oil pressure and period of stopping time required under any conditions of operation.

With this and other objects in view as may appear from the accompanying specification, the invention consists of various features of construction and combination of parts which will be first described in connection with the accompanying drawings showing an automatic shut down seal system for centrifugal compressors of a preferred form embodying the invention and the features forming the invention will be specifically pointed out in the claims.

In the drawings:

Figure 3 is a section through the line 3—3 of Figure 2.

Figure 4 is a cross section showing the construction of the timing valve.

Figure 5 is a cross section through the check valve used in conjunction with this system.

Figure 1:
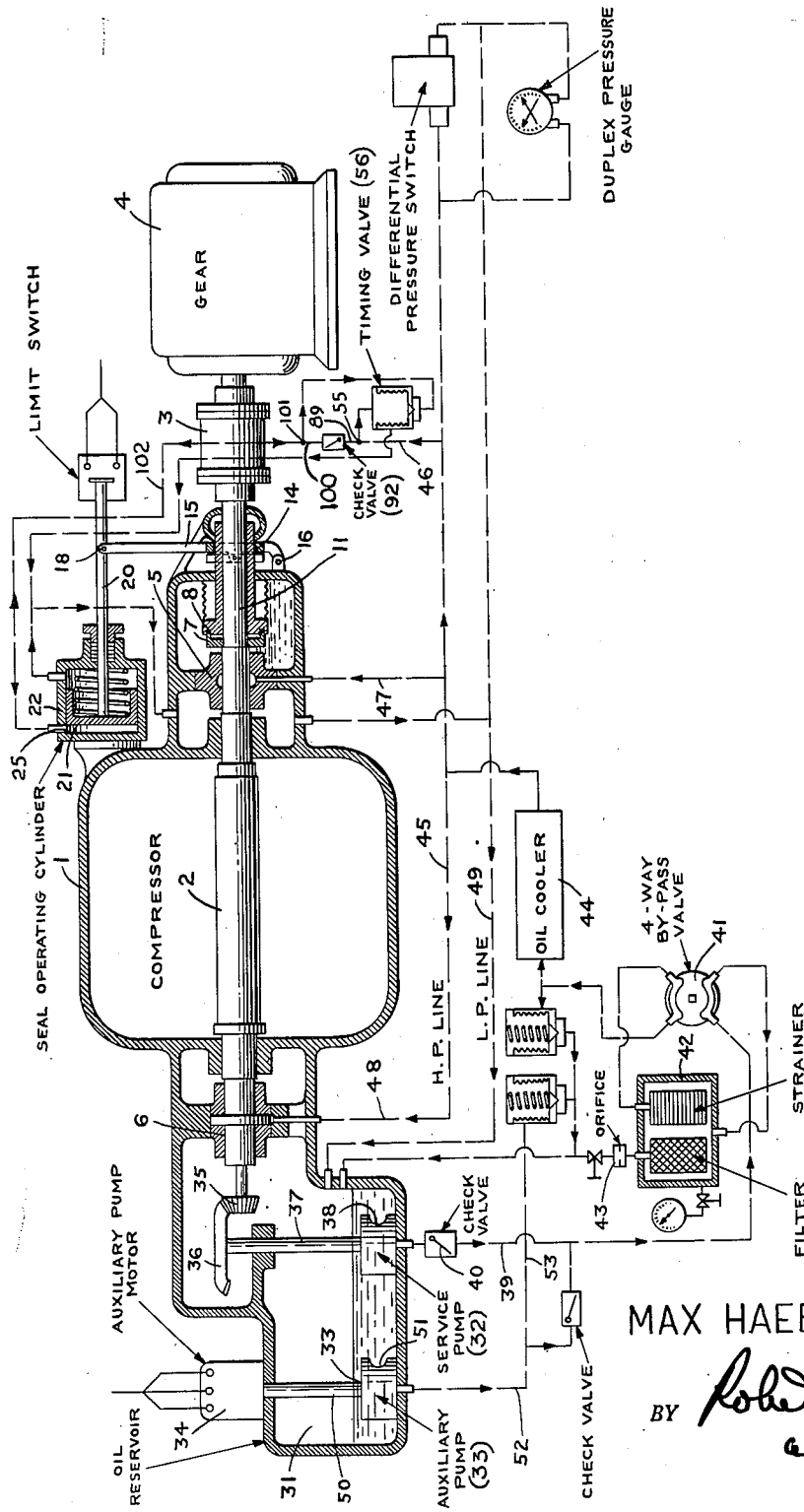
Figure 1 is a diagrammatic sketch showing the invention in relation to other portions of the compressor.

Referring more particularly to the drawings, Figure 1 illustrates a diagrammatic sketch of a typical compressor system showing generically a compressor 1 having a rotor 2 connected by a coupling 3 to step-up gears 4 which are in turn connected to a prime mover (not shown) which may be of any suitable type for operating the compressor 1. The reduction gears 4 may also be of any suitable type easily purchasable on the open market and are therefore generically indicated. The rotor 2 provided for the compressor 1 has a line bearing 5 at one end and a thrust bearing 6 at the other end to allow for relatively frictionless rotation of the rotor 2 during operation.

Figures 2, 4A:
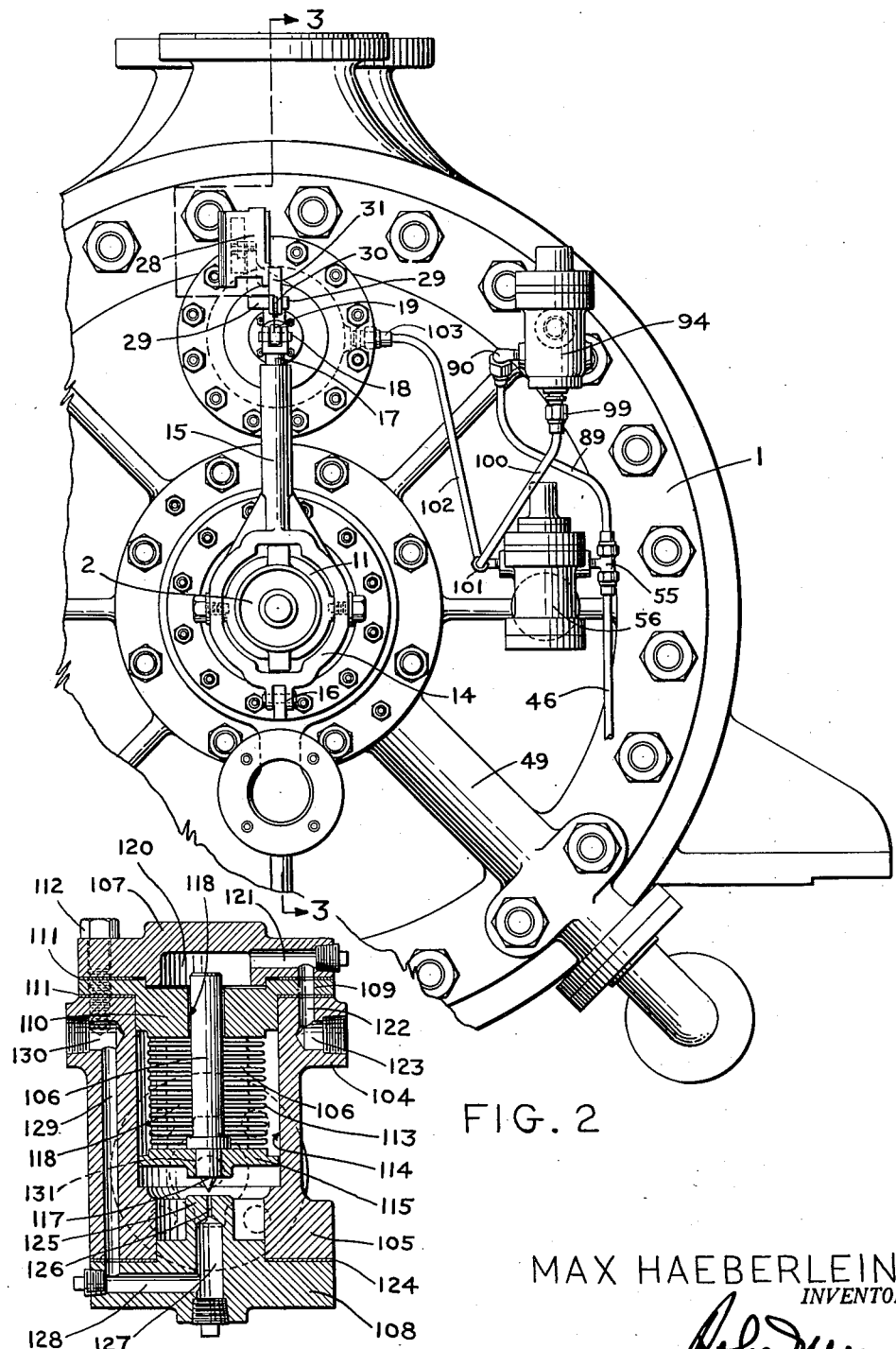
Figure 2 is an end view of the compressor showing the invention thereon.
Figure 4a is a cross section showing the construction of a modified timing valve.

The shut down seal system is indicated in Figure 1 at the line bearing end of the rotor 2, by a seal collar 7 in air tight relationship with a seal face 8. Figures 2 and 3, however, show the structure and operation more clearly.

Accordingly, Figure 3 shows the sealing collar 7, which is an annular ring-like structure threadably mounted on the rotor 2 and locked in position by a washer 9. A sealing face or insert 8 is formed by an annular rubber-like member fitted into a kerf or slot 10 in the sealing sleeve 11, the sealing sleeve 11 being a substantially tube-like structure mounted concentric to the axis of the rotor 2 and slidable axially thereon so that the sealing face or insert 8 can be moved into and out of air tight engagement with the sealing collar 7. A Sylphon bellows 12 is further provided which is a tube-like resilient member having one end fastened to the sealing sleeve 11 and the other end fastened to the back plate 13 of the compressor 1. The Sylphon bellows 12 operates to aid separating the atmospheric gases and the compressor gases both during normal operation and especially during shut down periods and is indicated in this preferred form due to the movability of the sealing sleeve 11 requiring a resilient member for movement therewith.

The sealing sleeve 11 extends along the rotor 2 outwardly of the compressor 1, through the back plate 13 to contact in pivotal engagement an annular portion 14 of a lever 15.

Lever 15 lies perpendicular to the axis of rotor 2 and pivots on a fulcrum 16 at one end. The other end is provided with a slidable portion 17 which is movably adjustable to extend or shorten the length of lever 15 depending on the size and type of compressor utilizing this fitting. The slidable portion 17 is pivotally connected at 18 to a threaded member 19 which receives one end of a piston rod 20 fixedly attached and movable with the seal operating piston 21. The seal operating piston 21 being reciprocatable in a seal operating cylinder 22 mounted on the compressor 1 as shown in Figures 1 and 3.

Seal operating cylinder 22 is substantially cylindrical in shape and lies so that its axis is parallel to and in the same plane with that of rotor 2. The rear portion 23 of the cylinder 22 provides an opening and bearing structure for the passage of the piston rod 20 therethrough to the piston 21 and also provides a support 24 for the piston returning spring 24' mounted concentrically around said support 24 between the back portion 23 which it abuts and the piston member 21. The seal operating cylinder is further provided with an inlet port 25 to provide means for receiving high pressure oil from the lubricating system to be hereinafter described and an exit passage 26 connected to an exit port 27 communicating with the low pressure or sump side of the lubricating system which operates to return by gravity flow operating fluid or lubricant which normally by-passes the piston member and to allow for equalization of pressures on either side of said piston when the pressure in the lubrication system drops.

A safety or limit switch 28 is also indicated in Figures 2 and 3 and is operated by the threaded member 19 moved by the piston rod 20. The threaded member has a cam actuator 29 which contacts a cam follower 30 on a lever arm 31 connected to the limit switch 28. As the lever arm 31 is moved back and forth it opens and closes the circuit to the driving means for the compressor so that when the seal face 9 is not in engagement with the seal collar 7 the circuit will be closed and the driving means will be operable. However, when the seal face 8 starts to move into contact with the seal collar 7, it permits the lever arm 30 to move accordingly and open the circuit to the driving means (not shown).

The operation and control of the seal operating cylinder 22 which in turn controls the operation of the shut down seal system is best described in connection with both the lubrication system indicated herein in Figure 1 of the drawings and the controls cooperatively connected in the lubrication system for accomplishing the desired purpose. It being understood that while this type of lubrication system is utilized that any type system which will supply fluid at high pressure for the operation of the seal operating cylinder 22 may be utilized with the control system as is shown herein.

Beginning at the thrust bearing end of the compressor 1, the end of the rotor 2 extends into a fully enclosed reservoir or oil sump 31 having a service pump 32 and an auxiliary pump 33 therein for supplying oil or other lubricant at high pressure to the lubrication system. The service oil pump 32 and auxiliary pump 33 are rotary gear pumps or other types of pumps suitable for this purpose which are easily purchasable on the open market.

Auxiliary pump 33 is driven by an electric motor 34 and is utilized to provide lubricant at high pressure to the lubrication system when starting up and shutting down and in case of failure of the service pump 32. An automatic pressure switch (not shown) starts the auxiliary pump motor when the oil pressure from the service pump falls below a predetermined level.

Figure 1 further shows the rotor 2 having a bevel gear 35 at the end thereof which drives the bevel gear 36 fixedly connected to a shaft 37 which is in turn connected to the service pump 32. Therefore, as the rotor 2 turns it drives the bevel gears 35 and 36 driving the shaft 37 which in turn drives the service pump 32. Oil or other lubricant is drawn from the reservoir or oil sump 31 into opening 38 in the service pump 32 and discharged from the service pump 32 at high pressure into a conduit 39 having a check valve 40 therein. Thereafter, the oil is forced through a four way by-pass valve 41 into a filter-strainer member 42 where a portion of the lubricant passes through a pressure control assembly 43 provided to by-pass a quantity of oil back to the reservoir, thereby maintaining a constant oil pressure differential across the service pump 32 regardless of the system pressure to protect the bearings (not shown) thereon. The remaining portion of the lubricant which is not by-passed goes through the strainer-filter member 42 to an oil cooler 44 near the four way by-pass valve 41 and is then conducted by the high pressure fluid line 45 to the various portions of the compressor 1 which utilizes the high pressure lubricant such as the thrust bearing 6, line bearing 5 and the shut down seal system, etc., which are supplied by their respective conduits 46, 47, 48, etc.

The high pressure lubricant is returned from the seal operating system and some of the other systems by gravity flow to the low pressure line 49 which conducts it to the reservoir or oil sump 31.

Auxiliary pump 33 utilized for starting up and shutting down in case of failure of the service pump 32 is shown in Figure 1 connected to the electric motor 34 by a shaft 50. The electric motor which may be operated manually or made automatically responsive to the pressure supplied by the service pump 32 operates the pump 33 by rotary shaft 50 connected thereto. This causes the pump to draw lubricant from the reservoir through an opening 51 therein which is forced out at high pressure through line 52. Line 52 connects to by-pass line 53 which maintains a constant pressure differential across the auxiliary pump by maintaining the level of the lubricant fluid in the reservoir and also connects to line 39 leading from the service pump 32. The flow of fluid through the system is thereafter identical with the description given above.

The shut down seal system receives the high pressure lubricant from line 45 through a control system which is responsive to the change in pressure in the lubrication system as hereinafter described.

Thus, the control means for the shut down seal receives the high pressure lubricant from line 45 via a conduit 46 which leads to a first T coupling 55 mounted on a timing valve 56 as clearly shown in Figure 2 of the drawings.

The timing valve structure 55 shown and described in my copending application, Serial No. 101,016 filed June 24, 1949, is indicated in Figures 2 and 4 of the drawings in the present application as a substantially cylindrical member formed by a body member 57, a Sylphon bellows portion 58, an upper head 59 and a lower head 60. The body member 57 is substantially tube-like, so that the Sylphon bellows portion 58 fits inside the body portion and snugly engages the upper end thereof by a support member 61. The upper head 59 engages and fits over the support member 61, and gasket members 62 are provided so that suitable means such as bolts 63 may be utilized to hold the body portion 57, the Sylphon bellows portion 58 and the upper head 59 in fluid tight relationship with each other.

The Sylphon bellows portion 58 shown in Figure 4 has a Sylphon bellows 64 which is an accordion-like resilient tube of suitable material of a lesser diameter than the inner surface 65 of the body portion 57. The bellows 64 depends from the support member 61 and is connected in fluid tight engagement at one end to the support member 61, and at the other end to a piston-like disc member 66 which lightly engages the said inner surface 65 so that the piston-like member 66 can be moved upwardly and downwardly as the pressure which is exerted on the Sylphon bellows 64 causes it to expand or contract.

An elongated valve stem 67 which is in axial alignment with the body portion 57 is also fixedly connected in fluid tight engagement with the piston-like member 66, extending downwardly therethrough and provided with a conical needle-like valve head 68 at the extended end thereof. It extends upwardly therefrom through the hollow portion 69 of the Sylphon bellows 64 to pass loosely through an opening 70 in the support member 61 into a chamber 71 formed by the upper head portion 59 of the timing valve 56.

The upper head portion 59 is an annular substantially flat member having a threaded opening 72 extending therethrough into the chamber 71 in axial alignment with the upper end 73 of the valve stem 67 so that a regulating member 74 adjustably engaging said opening 72 may be set to regulate the desired degree of movement of the valve stem 67. A locking nut 75 is provided on the regulating member 74 to fixedly position and lock the regulating member after it is set at the desired position. It being understood that while this type of regulating member and locking means are shown and described, other regulating and locking means embodying the same idea may be utilized for this purpose.

Chamber 71 formed by the upper head 59 communicates with a passage 76 in the upper head which is in turn connected to a transverse passage 77 passing through the upper head 59, the support member 61 and the body member 57 to connect to a first port 78 threadably connected to the first T coupling 55.

The lower head 60 is the closure member for the lower portion of the timing valve 56 and is a substantially annular flat member. A gasket 79 is provided between the lower head 60 and the body member 57 so that suitable means may be utilized to form a fluid tight connection therebetween. Concentric to the axial line of the conical valve head 68 is an upwardly extending cylindrical projection 80 on the annular flat portion of the lower head 60 which contains a valve port 81 therein in axial alignment with the conical valve head 68. The valve head 68 opening and closing the valve port 81 as the piston-like disc member 66 moves upwardly or downwardly.

The valve port 81 is an elongated orifice which may be sized any desired amount so that the opening thereof may be properly regulated by the clearance between the valve head 68 and the valve port 81. Valve port 81 communicates with a chamber 82 which in turn communicates with a passage 83 in the lower head 60 connected to a passage 84 in the body member 57. The passage 84 leads to a second port 85 in the body member 57.

The lower head 60 is further provided with a valve returning spring 86 which is concentrically mounted on the cylindrical projection 80 extending upwardly to contact a shoulder 87 on the piston-like disc member 66. This valve returning spring is relatively light as compared with the force acting on the area of the piston-like disc member 66 and therefore is easily compressed to allow the valve head 68 to engage the valve port 81. It will remain compressed until the pressure drops to a predetermined minimum at which time due to the pressure acting through the valve port 81 in addition to the expansion of the valve returning spring 86 the valve head 68 will be moved upwardly opening the valve port 81.

When the valve port 81 is opened an exit port 88 is provided on the body member 57 to allow the pressure fluid to drain by gravity flow to the low pressure line 49 which conducts it to the sump.

Thus, as high pressure oil arrives at the first T coupling 55 it passes into the inlet port 78, transverse passage 77 and passage 76 to the chamber 71 formed by the upper head. From chamber 71 it passes along the valve stem 67 through the opening 70 in the support member 61 into the hollow portion 69 of the Sylphon bellows 64. When these areas fill with pressure fluid the pressure then acts uniformly in the bellows causing it to expand moving the piston member 66 in a downwardly direction which compresses the valve returning spring 86 and causes the needle valve head 68 to close the valve port 81. The high pressure lubricant thereafter continues past the first T coupling 55 via a conduit 89 to an elbow 90 threadably engaging a check valve inlet port 91 on a check valve 92.

Check valve 92 may be any suitable type of check valve easily purchasable on the open market which will control the direction of flow of the lubricant fluid passing therethrough and prevent the back flow thereof when the pressure of the lubricant fluid reaches a predetermined minimum. A preferred form of check valve is shown in Figure 5 of the drawings as a spring-loaded bellows type substantially similar to the time valve 56 above disclosed.

Thus, check valve 92 is shown having a check valve body 95 with an inner chamber or hollow 94 into which the inlet port 91 will open. Connected by suitable means to the upper end of the check valve body 95 is an intermediate support member 95a and upper cover member 95b, and at the lower end a lower cover member 95c.

Slidably mounted in the inner chamber or hollow 94 is a piston-like disc member 96 fixedly connected adjacent the end of a needle valve stem 96a which extends upwardly therefrom in the axial line of the check valve 92 through an opening 96b in the intermediate support member 95a to a valve guide 96c provided in the upper cover member 95b. Valve stem 96a extends downwardly through the piston-like disc member 96 to form a needle-like valve head 97.

Opposing the upward movement of said piston-like disc member is a spring member 93 provided about said valve stem 96a which abuts the piston-like disc member 96 at its lower end and the upper cover member 95b at its upper end and an annular Sylphon bellows 96d which is formed about the spring and the valve stem so that it can be attached at its lower end adjacent the outer circumference of said piston member 96 and at its upper end to the intermediate support member 95a.

The spring 93 and bellows member 96d have a tension such that when the lubricant pressure acting on the piston-like disc member 96 reaches a predetermined minimum the member 96 will be forced downwardly and needle valve head 97 which opens and closes check valve exit port 98 in the lower cover member 95c will close the exit port 98. When the pressure is raised above the predetermined minimum pressure then the needle valve port will be opened. All of which is clearly shown in Figure 5 of the drawing.

In operation, it is the function of check valve 92 to prevent the back flow of high pressure fluid therethrough from cylinder 22 to the high pressure lines 89 and 46 when the pressure in the lubrication system drops and in actuality traps the fluid between the cylinder 22 and valve 56 until valve port 81 opens as is hereinafter described.

Thus high pressure lubricant fluid enters through the inlet port 91 where it expands in the inner portion 94 of the check valve body member 95 acting against a piston-like disc member 96 of similar construction to the above described piston-like member 66 and the timing valve 56. The area of the piston-like disc member is relatively large and therefore can compress the spring member 93 to open the needle valve head 97 fixedly connected to member 96 to allow the high pressure lubricant fluid to pass out of the check valve exit port 98 through a coupling 99 into a conduit 100 leading to a second T coupling 101 threadably engaging the second port 85 in the timing valve 56, all of which is clearly shown in Figures 2 and 5 of the drawings.

High pressure lubricant continues by flowing through the second port 85, the passages 84 and 83, chamber 82 and valve port 81 communicating with each other so that the pressure acting uniformly therein will act through the valve port 81 against the valve head 68 which under normal operating conditions will be closed as is shown in Figure 4 of the drawings. It can be readily seen that since the pressure acting in the Sylphon bellows 64 is the same as that acting in the valve head 68 and in view of the difference in area against which these pressures are acting that there will be an overwhelming downward force tending to keep the needle valve port 81 closed by the needle valve head 68 due to the differential pressure developed.

Thus, when the second port 85, passages 84 and 83, chamber 82 and valve port 81 are filled while the pressure continues to act the valve port 81 remains closed until the pressure in the Sylphon bellows drops below a predetermined minimum allowing the combined valve returning spring 86 and fluid pressure to act to cause the valve head 68 to pass the fluid by gravity flow through the exit port 88 to the low pressure or sump side of the lubricating system.

The high pressure fluid continues from the T coupling 101 through a conduit 102 to a coupling 103 threadably connected to the inlet port 25 of the seal operating cylinder 22 above described.

Referring now to Figure 3, it can be readily seen that as long as high pressure lubricating fluid is supplied by the service pump 32 or by the auxiliary pump 33, the high pressure fluid will enter the seal operating cylinder 22 where the fluid pressure acts against the seal operating piston 21 to move it in a rearwardly direction causing the piston returning spring 24' to be compressed. The piston rod 20 fixedly connected to the seal operating piston 21 also moves rearwardly moving the threaded member 19 and pivoting member 18 connected to the slidable portion 17 of the lever 15. The lever 15 is thus caused to also pivot rearwardly around the fulcrum 16. The sealing sleeve 11 connected by the annular portion 14 of the lever 15 will also move in a rearward direction opening the seal face 8 by moving it away from the seal collar 7 as shown in Figure 3.

When the lubricant or fluid pressure is reduced in the seal operating cylinder 22 the reverse action occurs as the seal operating piston 21 moves forwardly due to the expansion of the piston returning spring 24 carrying the piston rod 20 and lever 15 forwardly therewith to move the seal sleeve 11 forward until it causes the seal face 8 to make contact with the seal collar 7 as shown in Figure 1.

In the normal operation of the compressor 1 for shutting down, starting up or where the service pump fails, the auxiliary pump 33 is utilized to supply the high pressure lubricant fluid as above described for operating the shutdown seal system.

However, when an auxiliary pump 33 mishap occurs or when power failure occurs, the operation of the control system comes into effect to prevent the seal face 8 from engaging the seal collar 7 before the compressor 1 has come to rest.

Where power failure occurs the auxiliary motor 34 will not be available for operating the auxiliary pump and the driving means will stop driving the compressor 1 which will start to rest and depending on the size of the compressor this may take any period of time from two minutes to thirty minutes.

As long as the service pump 32 continues to operate it will supply some pressure which will be proportionate to the revolutions per minute or rate of rotation of the compressor 1. Therefore, while the compressor 1 will start to rest the pressure will not reduce immediately but only a proportionate amount depending on the rotation of the rotor 2 of the compressor 1 which drives the service pump 32. When the service pump 32 reaches a pressure which is below the predetermined setting of the check valve returning spring 93 the check valve 92 will close and prevent any further back flow of fluid from the seal operating cylinder 22 except through the port 81 of the timing valve 56. However, the piston-like disc 66 of the timing valve 56 is provided with such a large area it is only when the pressure supplied by the service pump 32 drops to a level corresponding to a very small number of revolutions per minute which are just short of the actual stopping time of the compressor 1, that the valve spring 86 and the pressure from the seal operating cylinder 22 caused by the expansion of the piston returning spring 24', which is in turn relayed to the fluid acting on the valve head 68 through the valve port 81, are able to unseat the valve head 68 to allow the pressure in the seal operating cylinder 22 to reduce automatically so that the piston 21 will move forward moving the seal face 8 into contact with the seal collar 7, as above described just as the compressor 1 comes to a stop or a few seconds thereafter. To positively accomplish this, the valve port 81 is properly sized and the valve head 68 is adjusted so that it will be raised only the required amount to allow the pressure to reduce in accordance with the rotation of the compressor so that the desired result will be secured. To regulate the amount the needle valve head 68 will be raised, the regulating member 74 is adjusted and locked so that the desired opening will be secured when the valve stem 67 is raised upwardly as the end 73 thereof will abut the regulating member 74 and the valve head 68 will be prevented from opening more than this adjusted setting.

When auxiliary pump 33 mishap occurs the same result will be effected as the pressure exerted by the service pump 32 will be sufficient to keep the timing valve 56 closed until the predetermined pressure differential across the piston-like member 66 is reached, which corresponds with the number of revolutions per minute of the compressor just before it comes to rest. There-
after the operation of the system will be the same.

Figure 4a is a modified timing valve 104 which is also shown and described in my copending application No. 101,016 filed June 24, 1949. The modified timing valve 104 has a structure substantially similar to that of the timing valve 56 with modifications as hereinafter described. It may be substituted and will operate similarly to the timing valve 56 to control the seal operating cylinder 22 and effect the desired result of the present invention.

The modified timing valve 104 is a substantially cylindrical member formed by a body member 105, Sylphon bellows portion 106, an upper head 107 and a lower head 108. The body portion 105 being substantially tube-like, so that the Sylphon bellows portion 106 fits inside the body member snugly engaging the upper end thereof by a flange 109 on an annularly shaped member 110. The upper head 107 engages and fits over the said flange 109 of the support member 110 and gasket members 111 are provided so that suitable means such as bolts 112 may be utilized to hold the body member 105, the Sylphon bellows portion 106 and the upper head 107 in fluid tight relationship with each other, all of which is substantially the same as the timing valve 56.

The Sylphon bellows portion 106 shown in Figure 4A, has a Sylphon bellows 113, which is an accordion-like resilient tube of suitable material of a lesser diameter than the inner surface 114 of the body portion 105. The bellows 113 depends from the support member 110 and is connected in fluid tight engagement at one end to the support member 110 and at the other end to a piston-like disc member 115 which lightly engages the inner surface 114 so that the piston-like member 115 can be moved upwardly and downwardly as the pressure which is exerted on the Sylphon bellows 113 causes it to expand or contract.

An elongated valve stem 116 which is in axial alignment with the body portion 105 is also fixedly connected in fluid tight engagement with the piston-like member 115 extending downwardly therethrough and provided with a conical needle-like valve head 117 at the extended end thereof. It extends upwardly therefrom through the hollow portion 118 of the Sylphon bellows 113 to pass loosely through an opening 119 in the support member 109 into a chamber 120 formed by the upper head portion 107 of the timing valve 104.

The upper head portion 107 is a substantially annular flat member and is provided with a passage 121 therein connected to the chamber 120 and communicating by a transverse passage 122 passing through the upper head 107, flange 109 and body member 105 with a first inlet port 123. The inlet port 123 receives the first T coupling 55 substantially identically with the first inlet port 78 of the timing valve 56.

The lower head 108 is the closure member for the lower portion of the body member 104 and is also a substantially annular flat member. A gasket member 124 is provided between the lower head and the body member 104 so that suitable means (not shown) may be utilized to form a fluid tight connection therebetween. Concentric to the axial line of the conical valve head 117 is an upwardly extending cylindrical projection 125 on the annular flat portion of the lower head 108 which contains a valve port 120 therein in axial alignment with the conical valve head 117. The valve head 117 opening and closing the valve port 126 as the piston-like disc member 114 moves upwardly and downwardly.

The valve port 126 is an elongated orifice which may be sized to any desired amount so that the opening thereof may be properly regulated to reduce the pressure in the seal operating cylinder 22 when the valve head 117 is unseated therefrom. The valve port 126 communicates with a chamber 127 which in turn communicates with a passage 128 in the lower head connected to a passage 129 in the body member 105. The passage 129 leads to a second port 130 on the body member 105 which threadably receives the second T coupling 101 substantially identically with the timing valve 56.

It is particularly pointed out that the modified timing valve 104 is simplified by not having a valve returning spring 86 nor a regulating member 24 as is shown on the timing valve 56. Therefore, in order to provide regulating means, the flange portion 109 of the support member 110 is fitted to the upper end of the body member 105 whereby the thickness of the flange 109 which may be adjusted by cutting a portion thereof or adding shims (not shown) whichever is necessary to allow the remaining portion of the Sylphon bellows member 106 to depend from the support member 110 whereby the needle valve head 117 will be in an open portion when there is no positive pressure being exerted inside or outside of the Sylphon bellows portion 113 or against the piston-like member 115.

Thus, in operation, where the modified timing valve 104 is substituted for the timing valve 56, higher pressure fluid enters the first port 123 expanding through the passages 122, 121 and chamber 120 and passes from chamber 120 through the opening 119 into the hollow portion 118 of the Sylphon bellows 113. Pressure will be exerted uniformly in the Sylphon bellows 113 causing the Sylphon bellows 113 to expand and move the piston-like member 115 downwardly causing the needle-like valve member 117 to close the valve port 126.

As above described with respect to the timing valve 56 the high pressure lubricant then passes to the check valve 92 via conduit 89, elbow coupling 90 and returns to the modified timing valve 104 via conduit 100 and second T coupling 101 connected to the second port 130 in the modified timing valve.

The lubricant fluid now expands through passages 129 and 128 into chamber 127 and acts against the valve head 117 through the valve port 126 communicating with the chamber 127. However, once again the structure of the piston-like member 115 similarly to the piston-like member 66 of the timing valve 56 has such a large area in relation to the area of the valve port 126 through which the pressure fluid must act that a pressure differential is created which keeps the needle valve 117 seated in the port 126.

The modified timing valve 104 will remain thus seated until the pressure of the lubricant or fluid action in the Sylphon bellows is lowered to a predetermined level corresponding to the number of revolutions and pressure equivalent delivered by compressor 1 which exists just before the compressor 1 will come to rest. At that time the Sylphon bellows 113 will start to compress back to its original size which together with the higher pressure maintained in the seal operating cylinder 22 by the action of the check valve 92 and the piston returning spring 24' will unseat the needle-like valve head 117 to allow the pressure in the seal operating cylinder 22 to pass out through the properly sized valve port 126 to an exit port 131 operating on the inner surface 114 of the body member 105 which allows the fluid to pass by gravity flow to the sump or reservoir 31 of the compressor 1.

The valve port 126 will naturally be sized in accordance with the time period during which it takes the compressor 1 to come to a stop after it reaches the predetermined pressure which will allow the valve head 117 to unseat so that the seal operating cylinder piston 21 will move forwardly in accordance with the reduction in pressure to move the seal face 8 as above described into contact with the seal collar 7 as the compressor comes to rest or a few seconds thereafter.

While one form of the invention is shown and described, it will be understood that the invention is not to be limited to the specific construction or arrangement of parts shown but that they may be widely modified within the invention defined by the claims.

What is claimed is:

1. A shut down seal system for centrifugal compressors having a rotor and a lubrication system with the pressure therein controlled by the speed of said rotor comprising, a seal collar mounted on said rotor, a shut down seal movably mounted on said rotor for air tight engagement with said seal collar, means for moving said shut down seal into and out of engagement with said seal collar operated by pressure fluid from said lubrication system, a single conduit means connected between said means and the lubrication system for conducting pressure fluid to and away from said means for operating the shut down seal, a check valve connected in said conduit adapted to close at a predetermined reduction in pressure in said lubrication system, and timing means normally maintained closed by pressure fluid from said lubrication system and provided with an inlet connected to said conduit between said first mentioned operating means and said check valve and a discharge to said lubrication system for returning pressure fluid, said timing means to control the rate of return flow of said pressure fluid from said first mentioned operating means to said lubrication system when the said check valve is closed to prevent engagement of said seal collar by the shut down seal until the rotor is at rest.

2. In a shut down seal system as claimed in claim 1 wherein said timing means includes, a piston and bellows structure slidably mounted therein and communicating directly with said lubrication system to receive pressure fluid therein, and a regulating means connected to said piston and bellows structure to control the amount of operating fluid that can pass from said inlet to said discharge, said regulating means coacting with said piston and bellows structure to normally maintain said inlet closed and adapted to open at a minimum pressure determined by the ratio between the back pressure acting through said inlet and the fluid pressure from said lubrication system acting in said piston and bellows structure.

3. A shut down seal system for centrifugal compressors having a rotor and a lubrication system with the pressure therein controlled by the speed of said rotor comprising, a seal collar fixedly mounted on said rotor, a shut down seal movably mounted on said rotor for air tight engagement with said seal collar, means for moving said shut down seal into and out of engagement with said seal collar operated by pressure fluid from said lubrication system, a single conduit means connected between said means and the lubrication system for conducting pressure fluid to and away from said means for operating the shut down seal, a check valve connected in said conduit adapted to close at a predetermined reduction in pressure in said lubrication system, and timing means including, a valve chamber formed in said timing means, a piston and bellows structure slidably mounted in said valve chamber forming a chamber communicating by a single inlet-outlet port with said lubrication system to receive pressure fluid therein, an inlet port for said valve chamber connected to said conduit, a discharge port for said valve chamber connected to said lubrication system for conducting pressure fluid admitted to said valve chamber through said inlet port back to the lubrication system, and a combined valve and regulating means connected to said piston and bellows structure for opening and closing said inlet port, said combined valve and regulating means and said piston and bellows structure so constructed and arranged that the valve will normally maintain said inlet port closed when the compressor is operating and will open said inlet port at a minimum pressure determined by the ratio between the back pressure of the lubricating fluid acting through said inlet port and the fluid pressure of the lubrication system acting in the chamber formed by said piston and bellows structure, and said regulating means to control the rate of back flow through said inlet port so that the shut down seal will contact the seal collar only after the compressor has come to rest.

4. In a shut down seal system as claimed in claim 3 wherein said regulating means includes, the elongated valve stem of the valve extending through the piston and bellows structure along its axial line, a threaded member adapted to abut the end of said elongated valve stem for controlling its opening movement with respect to said inlet port, and a locking nut for holding said threaded member in the desired position.

5. In combination with a centrifugal compressor having a rotor and a lubrication system operated by said rotor for pumping fluid therein under pressure, a shut down seal system including, a seal collar fixedly mounted on said rotor, a shut down seal movably mounted on said rotor in air tight engagement with said seal collar, a seal operating cylinder for moving said shut down seal into and out of engagement with said seal collar by pressure fluid from said lubrication system, and a single conduit means connected to said seal operating cylinder for conducting pressure fluid to and away from said seal operating cylinder from the lubrication system, of a check valve in said conduit means to be closed at a predetermined reduction in pressure in said lubrication system, and timing means normally maintained closed by pressure fluid from said lubrication system and provided with an inlet connected to said conduit between said seal operating means and said check valve and a discharge to said lubrication system for returning pressure fluid thereto from said seal operating means, said timing means to control the rate of return flow of said pressure fluid from said seal operating cylinder to said lubrication system when said check valve is closed to prevent engagement of said seal collar by the shut down seal until the rotor is at rest.

6. In the combination as claimed in claim 5 wherein said timing means includes, a piston and bellows structure slidably mounted therein and communicating directly with said lubrication system to receive pressure fluid therein, and a combined valve and regulating means connected to said piston and bellows structure to control the amount of pressure fluid that can pass from said inlet to said discharge on said timing means.

MAX HAEBERLEIN.

REFERENCES CITED

The following references are of record in the file of this patent:

UNITED STATES PATENTS

| Number | Name | Date |
|---|---|---|
| 1,947,017 | McHugh | Feb. 13, 1934 |
| 2,254,862 | Watson et al. | Sept. 2, 1941 |
| 2,300,385 | Kollberg et al. | Oct. 27, 1942 |